(12) United States Patent  (10) Patent No.: US 8,119,209 B2
Palladino  (45) Date of Patent: Feb. 21, 2012

(54) METHOD OF FORMING LAYERS OF GETTER MATERIAL ON GLASS PARTS

(75) Inventor: Saverio Massimo Palladino, Lainate MI (IT)

(73) Assignee: Saes Getters S.p.A., Lainate MI (IT)

( * ) Notice: Subject to any disclaimer, the term of this patent is extended or adjusted under 35 U.S.C. 154(b) by 664 days.

(21) Appl. No.: 12/281,178

(22) PCT Filed: Mar. 2, 2007

(86) PCT No.: PCT/IT2007/000157
§ 371 (c)(1),
(2), (4) Date: Aug. 29, 2008

(87) PCT Pub. No.: WO2007/099577
PCT Pub. Date: Sep. 7, 2007

(65) Prior Publication Data
US 2009/0011144 A1   Jan. 8, 2009

(30) Foreign Application Priority Data

Mar. 3, 2006  (IT) ............................... MI2006A0390

(51) Int. Cl.
  *B05D 1/12*  (2006.01)
  *B05D 3/00*  (2006.01)
  *C08J 7/18*  (2006.01)
  *G21H 5/00*  (2006.01)
  *C03C 17/00*  (2006.01)

(52) U.S. Cl. ......... 427/555; 427/180; 427/554; 65/60.1; 65/60.4

(58) Field of Classification Search .................. 65/60.1, 65/60.4; 427/162, 164, 180, 212, 215, 226, 427/227, 554, 555
See application file for complete search history.

(56) References Cited

U.S. PATENT DOCUMENTS

| | | | |
|---|---|---|---|
| 3,203,901 A | | 8/1965 | Della Porta |
| 4,306,887 A | | 12/1981 | Barosi et al. |
| 4,312,669 A | | 1/1982 | Boffito et al. |
| 5,882,727 A | * | 3/1999 | Corazza et al. ............... 427/229 |
| 5,961,750 A | | 10/1999 | Boffito et al. |
| 5,985,202 A | * | 11/1999 | Ozaki et al. ................... 264/401 |
| 6,042,443 A | | 3/2000 | Carella et al. |
| 6,252,229 B1 | | 6/2001 | Hays et al. |
| 6,472,819 B2 | | 10/2002 | Carretti et al. |
| 6,600,129 B2 | * | 7/2003 | Shen et al. ................ 219/121.61 |
| 2005/0231096 A1 | * | 10/2005 | Ishige et al. .................. 313/495 |
| 2006/0083896 A1 | | 4/2006 | McKinnell et al. |

FOREIGN PATENT DOCUMENTS

| | | |
|---|---|---|
| EP | 0 718 061 A1 | 6/1996 |
| EP | 0 869 195 A1 | 10/1998 |
| EP | 1 513 183 A1 | 3/2005 |

* cited by examiner

*Primary Examiner* — Frederick Parker
*Assistant Examiner* — Michael Wieczorek
(74) *Attorney, Agent, or Firm* — Panitch Schwarze Belisario & Nadel LLP

(57) ABSTRACT

A method of forming a layer (12) of getter particles (11) on a glass part (10) includes contacting the getter particles with the glass part and irradiating the particles through the glass by a laser, thus heating the particles at a temperature greater than the softening temperature of the glass but lower than the melting temperature of the particles.

15 Claims, 3 Drawing Sheets

METHOD OF FORMING LAYERS OF GETTER MATERIAL ON GLASS PARTS

CROSS-REFERENCE TO RELATED APPLICATIONS

This application is a Section 371 of International Application No. PCT/IT2007/000157, filed Mar. 2, 2007, which was published in the English language on Sep. 7, 2007, under International Publication No. WO 2007/099577 A2 and the disclosure of which is incorporated herein by reference.

BACKGROUND OF THE INVENTION

The present invention relates to a method of forming layers of getter material on glass parts.

Various industrially manufactured products require, for their correct operation, maintaining vacuum or the composition of a predefined gaseous atmosphere within an enclosure defined by tightly sealed glass walls. As examples of industrial products having glass walls inside which vacuum is required, cathode tubes, field emission displays (known as FEDs), IR sensors, or some types of lamps may be cited, whereas examples of industrial products requiring the presence of a controlled atmosphere are some types of lamps or plasma displays.

The desired condition of vacuum or gaseous composition is obtained through evacuation operations of the enclosure, possibly followed by its filling with the desired gaseous atmosphere and by the subsequent airtight sealing of the enclosure, generally by means of welding operations of or between the glass walls defining the same.

However, there are phenomena that tend to modify the above-mentioned desired condition over time, thus degrading the functional characteristics of the industrial product. A first phenomenon is the gas release from the same glass forming the walls of the sealed enclosure or from the materials forming portions of the industrial product being present therein (phenomenon known in the field as "outgassing"), particularly in case the space is evacuated. A second possible phenomenon is the permeation of some gases, hydrogen in particular, through the walls. Finally, another possible source of alteration of vacuum or desired gaseous atmosphere occurs during the sealing of the enclosure, which requires melting operations of portions of the walls or of a vitreous paste placed between two portions of the walls. This operation is carried out at relatively high temperatures (some hundreds of degrees Celsius) and can result in intense gas releases. The gases more commonly contributing to these degradation phenomena are hydrogen, oxygen, water vapor, carbon oxides, and some small size hydrocarbons.

In order to overcome such drawbacks it is known to employ a getter material inside the sealed enclosure. Getter materials have the property of being able to fix molecules of the above-mentioned gases by means of physical sorption phenomena or actual chemical reactions. Getter materials of the second type are preferable, because the chemical reactions they give rise to are not reversible depending on temperature, and thus the sorbed gases are no longer released, not even upon intense heating of the industrial product. In the rest of the text and in the claims "getter materials" will refer to the latter ones, which will also be simply indicated as getters. Getter materials useful for the purposes of the invention are some metals as titanium, zirconium, niobium or tantalum; or metal alloys, generally based on zirconium or titanium and further comprising one or more transition metals, Rare Earths or aluminum. Interesting getter alloys for the present invention are for example an alloy of weight composition Zr 84%-Al 16%, disclosed in U.S. Pat. No. 3,203,901; an alloy of weight composition Zr 76.5%-Fe 23.5%, disclosed in U.S. Pat. No. 4,306,887; an alloy of weight composition Zr 70%-Fe 5.4%-V 24.6%, disclosed in U.S. Pat. No. 4,312,669; and an alloy of weight composition Zr 80%-Co 15%-A 5% (where A indicates one or more Rare Earth metals) disclosed in U.S. Pat. No. 5,961,750. The four above-mentioned patents are in the name of applicant (Saes Getters S.p.A.), and the four cited alloys are sold by the applicant under the trademarks St 101, St 198, St 707, and St 787, respectively.

In some industrial products, the space for inserting the getter material is extremely reduced. This is the case, for example, of FEDs or plasma displays, where the inner space has a thickness of a few hundreds of microns. In these conditions it is not possible to employ common getter devices, formed of powders of the material inserted in a three-dimensional housing.

U.S. Pat. Nos. 6,042,443 and 6,472,819 disclose getter systems to be respectively inserted into a FED and a plasma display. However, the systems of these patents have the drawback of requiring a metal support for getter powders, which reduces the available thickness for the getter material. Moreover, these systems are not suitable in the case of industrial products with even lower thicknesses of the inner space, as for example microbolometers, i.e., miniaturized IR sensors with a glass window, produced through techniques derived from the semiconductor industry: a microbolometer and the process for its manufacturing are described, for example, in U.S. Pat. No. 6,252,229.

European published patent application EP 1,513,183 A1 discloses an alternative method of introducing a getter device into an industrial product having glass walls, the method comprising: forming (e.g. by compression in a mold) a flat getter body with desired lateral dimensions; laying the getter body onto the desired part of the glass wall; heating the getter body, or at least the portion directly contacting the glass up to the melting temperature of the getter, e.g. by laser radiation, exploiting the fact that glass is transparent to radiation (and thereby is not heated by it) while the getter material sorbs the energy of the same radiation, thus indirectly obtaining also the melting of the portion of the glass wall adjacent to the getter; finally, letting the whole solidify, obtaining the welding of the getter on the glass wall. This method is certainly new with respect to those previously known, but still suffers from some drawbacks. Firstly, the melting of getter materials requires high temperatures, in excess of 1000° C., which, mainly in the case of a fast heating and/or following cooling, may result in high thermal stresses in the glass wall and its breaking. The melting and subsequent solidification has also the drawback that portions of molten material could move laterally on the wall, thus coming into contact with undesired functional areas or portions inside the industrial product. Secondly, as the sorbing properties of getter materials depend on their exposed surface, these are generally used in the form of powders (possibly mechanically compacted) in order to provide a surface-area/volume ratio as high as possible. In the method of the cited patent application, the getter material is caused to melt and then re-solidify, and at the end of this process the material looks like a compact body of a reduced surface area and thus of poor sorbing properties. In addition, the method requires anyway the pre-forming of a self-standing getter body starting from powders. In order to have sufficient mechanical characteristics for being handled until it is placed in contact with the glass, the getter body must anyway have a size (and, particularly, a thickness) not lower than some hundreds of microns. This may cause problems in accommodating the getter body in the final industrial product in terms of thickness, particularly in case of industrial products of small size. Finally, this method still requires positioning the getter body on a glass part, particularly in the case of miniaturized industrial products wherein the lateral size of the space available for the getter may be very small, e.g. few tens of microns, the positioning precision may be critical, and in this case possible lateral movements of the molten material could be particularly dangerous.

BRIEF SUMMARY OF THE INVENTION

An object of the present invention is to provide a method of forming getter material layers on glass parts, which does not suffer from the above-mentioned drawbacks.

This and other objects are achieved according to the present invention by a method of forming getter material layers on glass parts, comprising the following steps:

contacting loose powders of getter material with the glass part onto which it is intended to form the layer;

heating the particles of powder directly in contact with the glass at a temperature lower than the melting temperature of the particles, but higher than the softening temperature of glass, by irradiating the particles in direct contact with the glass with laser radiation reaching the particles through the glass;

letting the system cool until the re-solidification of the areas of the glass portion softened or molten during the previous step; and removing possible powder particles not directly contacting the glass and not irradiated with the laser.

Glasses are amorphous materials of a solid consistency, generally comprising at least 70% by weight of silica, whereas the rest is made of one or more other oxides, such as boron oxide (borosilicate glasses), alkaline or alkaline-earth metal oxides, particularly sodium oxides (so-called "soda-lime" glasses), lead glasses and possible other additions of lower amounts of further oxides, such as aluminum oxide. Differently from the properly-called solids (crystalline solids), which have a well-defined transition temperature from the solid to the liquid state, glasses are characterized by a continuous transition between the two states, which takes place in a wide range of temperatures (hundreds of degrees Celsius). Within this range, for exclusively technological purposes, some characteristic temperatures are conventionally defined, in particular a softening temperature (generally defined as the temperature at which glass viscosity has a value of 107.5-108 Poise), a workability temperature (defined as the temperature at which glass viscosity has a value of 104-105 Poise), higher than the softening temperature, and a melting temperature, higher than the two previous temperatures. In the range between softening and workability temperatures, a glass is provided with plastic characteristics, whereby it can be deformed by applying a mechanical stress. The method of the invention includes heating the powder particles through the glass by a laser, at a temperature not high enough to cause them to melt, but higher than the softening temperature of the glass. In this way, the heat transferred by the particles to the glass causes the softening or the melting of micro areas of glass, located at the points where the glass contacts the particles. The glass of these micro areas is deformed and surrounds the fraction of the getter particles directly contacting it, and solidly binds these particles upon re-solidification.

The glass chosen for use in the method must be transparent at the wavelength of the laser radiation employed. This condition can be assured by selecting the laser as a function of the glass or, alternatively, choosing the glass given the laser. For instance, if the laser has a wavelength in the near-infrared region, it is possible to use a borosilicate glass or a fused silica glass.

Compared to the method disclosed in European patent application EP 1,513,183 A1, the method of the present invention has the limit of being applicable only in the case in which the melting temperature of the getter particles is higher than the softening temperature of the glass part, whereby it could be not applicable to all the possible combinations of getter/glass materials usable in industry, e.g. in the case of quartz glasses with some getters. Against this limit, the method of the present invention has a series of advantages with respect to the cited European patent application:

the temperature achieved by the glass is certainly lower than that required in the known method, thus avoiding or minimizing the risk of breaking of the glass part;

the risk of movement of molten portions is practically avoided, which portion could go out of the area intended for the getter presence;

there is no melting of the getter material particles, so that their surface area is substantially unchanged, preserving the gas sorption characteristics;

it is not necessary to pre-form a getter body, e.g. by pressing the powders, because loose powders are used, and the final shape of the layer is directly defined by the area irradiated by the laser beam. This means a very high inherent precision of the positioning of the layer, and the possibility of obtaining deposits having very reduced lateral dimensions, which were not achievable with the known method.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

The method of the invention is not limited to the use with flat glass parts. For example, the method could be used for forming getter layers inside a concave glass part (as, for example, a lamp bulb), by simply pouring getter material powders into the cavity and irradiating from the lower part. Similarly, the method is not limited to the use in particular geometrical positions. For example, it is possible to form a top open box with one of the lateral walls formed by the glass part, filling the box with the getter powder and irradiating the desired area of the lateral glass wall. From the industrial point of view, however, the most useful configurations are those in which the glass part is flat and horizontally arranged (or essentially horizontal, as specified in the following), above or beneath the getter material powders. In the rest of the description reference will be made to these latter two configurations.

Figure 1:
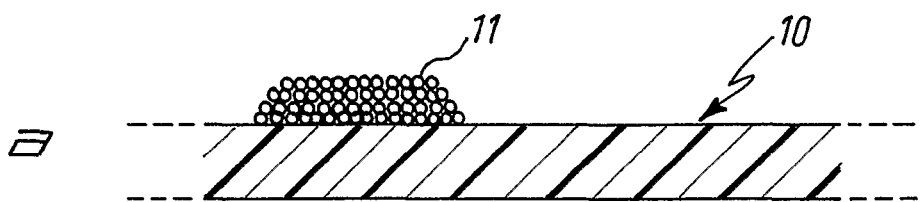
FIGS. 1a, 1b and 1c are cross-sectional side views showing the main steps of the method of the invention, in a first embodiment thereof.
Figure 1:
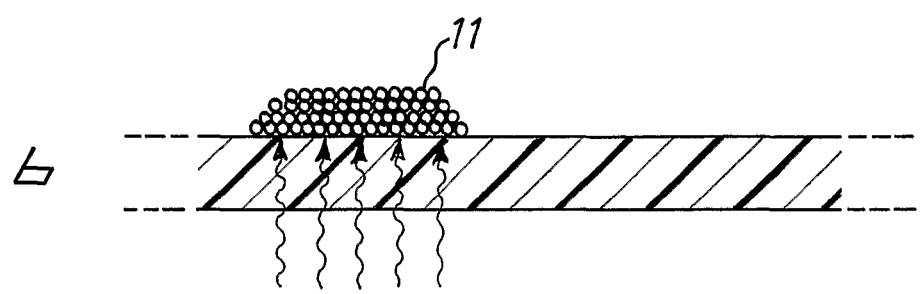
Figure 1:
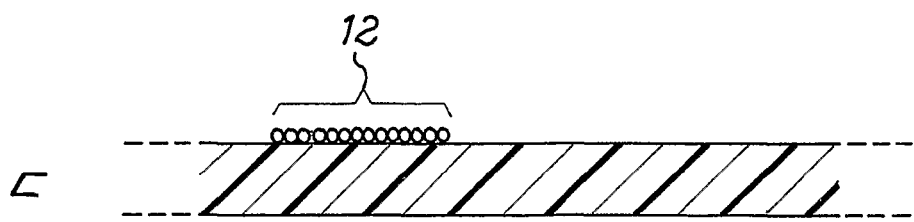

FIG. 1 shows a first embodiment of the method of the invention, showing the accomplishment of the main steps of the method and their result.

In this embodiment, as shown in FIG. 1a, the glass part 10 is arranged horizontally and the getter powder 11 is then distributed on an area of the glass part.

The subsequent step, shown in FIG. 1b, comprises irradiating a fraction of the powders with laser radiation (represented by wavy arrows) through the glass part. This step is carried out with a laser radiation power and a time sufficient to heat the powder particles directly contacting the glass to a temperature higher than the softening temperature of the glass but lower than the melting temperature of the same particles. In this way, the irradiated particles release heat by conduction to the points of the glass portion they are in contact with, and cause the plastic deformation or localized melting of the micro areas surrounding these points, so that the glass surrounds or wets the lower portion of the getter particles.

At the end of this step the system is allowed to cool, thus giving way to the solidification of the micro areas previously softened or melted. The lower portion of the getter particles remains included in the solidified glass, so that these particles adhere to the glass. As the intensity of the laser radiation in the previous step is controlled in such a way not to cause the melting of the getter particles, there is no adherence among adjacent particles, so that the only particles being fixed are those irradiated and directly contacting the glass.

The subsequent step thus comprises removing the non-adhered particles, for example by simply inclining the glass part, or by aspiration. The result of the latter step is illustrated in FIG. 1c, showing glass part 10 with a layer 12 of getter particles adhered to the part.

Figure 2:
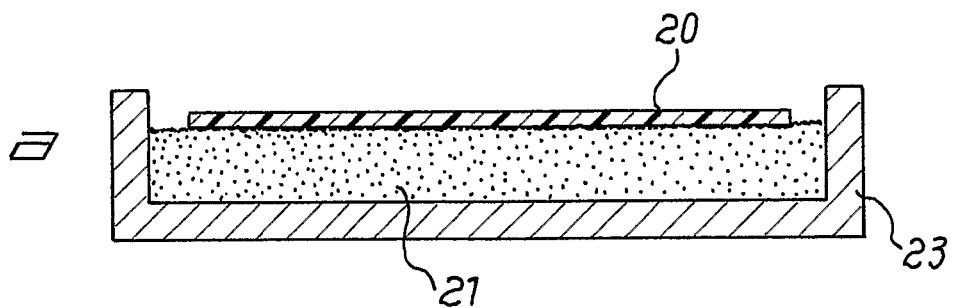
FIGS. 2a, 2b and 2c are cross-sectional side views showing the main steps of the method of the invention, in a second embodiment thereof.
Figure 2:
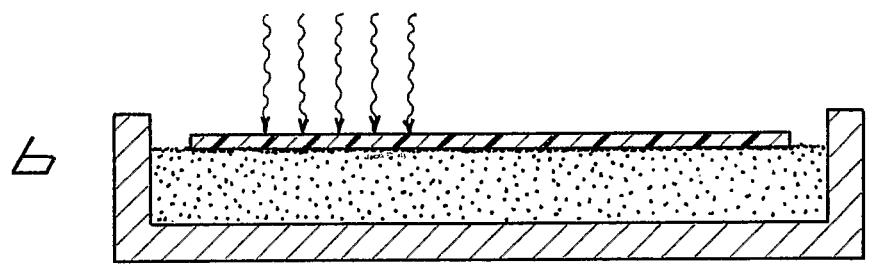
Figure 2:
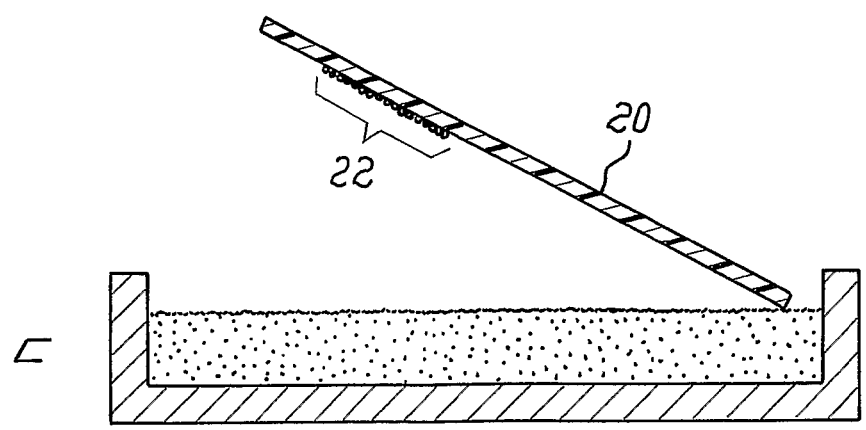

FIG. 2 shows an alternative embodiment of the method of the invention. In this case the getter powders 21 are inserted in a container 23 open at the top and having a sufficient area to receive a glass part 20. The part 20 is laid on the "bed" of powders (FIG. 2a), it is subjected to radiation from the top (FIG. 2b), it is allowed to cool until the solidification of the softened or molten glass micro areas, and finally part 20, on which the layer 22 of getter particles is adhered, is raised (FIG. 2c).

Each of the two above-described embodiments has some advantages. The first embodiment is more complex because it requires irradiation from the bottom and thus suitable supports for part 10, a perfectly (or nearly) horizontal position of part 10 in order to avoid the particles 11 slipping away before the irradiation, and one step of removal of the non-adhered powders. On the other hand, the contact between the getter particles and part 10 is assured. Vice versa, in the second embodiment the irradiation is carried out from the top, the part 20 being supported by the same particles, the removal of non-adhered particles is carried out by simply raising part 20 at the end of the method and does not require that part 20 be perfectly horizontal, but the contact between part 20 and particles in the irradiated area may not be assured, unless the bed of particles is prepared with extreme caution before positioning the part 20.

Figure 3:
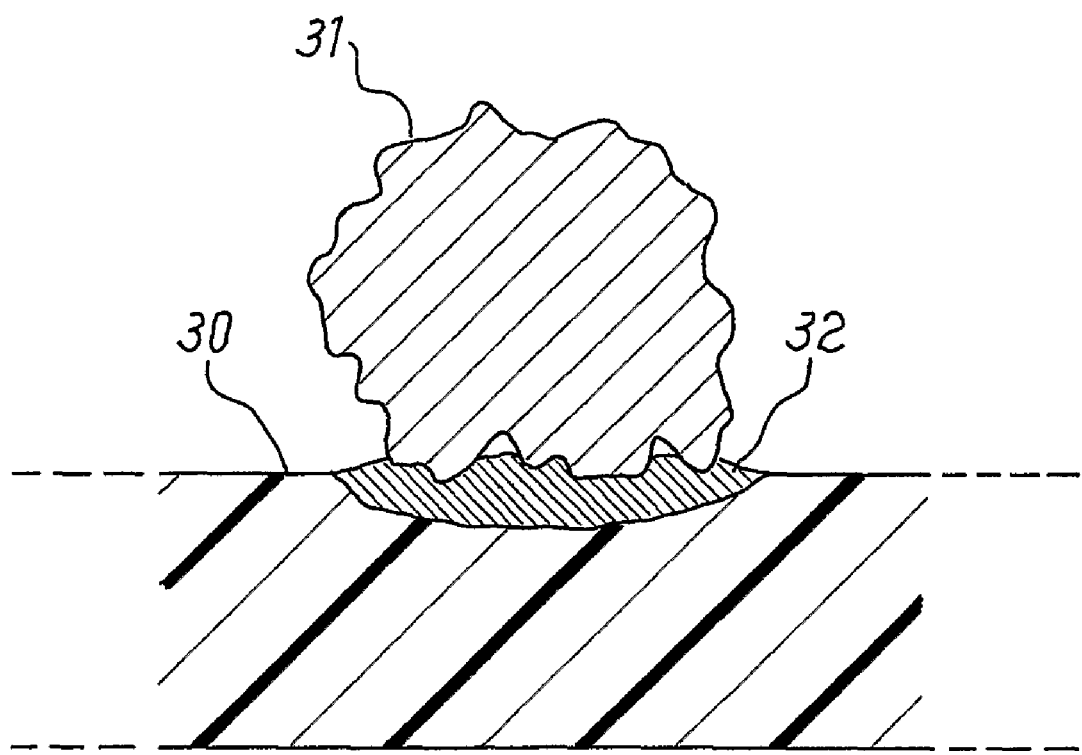
FIG. 3 is a cross-sectional enlarged side view of a getter particle joined to a glass part.

FIG. 3 shows the final result of the method in an enlarged view (the parts are not in scale, and in particular the getter particle size is strongly enlarged for clarity of illustration). The getter particle 31 adheres to glass part 30 by the glass of micro area 32 (identified by the thicker cross-hatching), which, after softening or melting and subsequent solidification, penetrates pores or includes the lower portions of particle 31.

The irradiation step may be carried out by a defocused laser, by simultaneously irradiating the whole area of interest, possibly resorting to masks for delimiting this area. Alternatively, the area to be irradiated may be covered by a laser beam scanning, defocused or not. In particular, in this second mode it is possible to obtain deposits having a very limited size, with extremely precise positionings and also complex geometries, with the result of "writing" the getter deposit on the surface of the glass part. In both these cases (simultaneous irradiation of the whole area, or its scanning with the laser beam), the laser source can be controlled through a feedback control system comprising a pyrometer (preferably a radiation pyrometer), which realizes the condition that the irradiation time is regulated so as to cause the getter particles not to reach a temperature over a preset value.

The method of the invention could be carried out in air, but as getter particles heated in this atmosphere are strongly passivated by covering with deposits formed by the particle metals with atmospheric gases (particularly oxides, carbides and, for some getters, also nitrides), it is then necessary for a quite long activation process carried out at a relatively high temperature, in order to cause the formed species to diffuse toward the center of the particle, thus exposing a new metal surface ready for further sorptions. In order to avoid this problem, it is preferable to carry out the method under vacuum or in an atmosphere of an inert gas, at least for the whole time in which getter particles are at temperatures higher than about 300° C. The gas may be argon or also nitrogen, in the case a getter is used to which this gas is inert, such as the Zr—Fe alloys of U.S. Pat. No. 4,306,887. For this purpose, the irradiation and cooling steps (or even all the steps of the method) may be carried out in a gas tight process chamber, being evacuable and provided with connections to gas lines for filling with the inert gas.

As previously stated, the method of the invention is applicable in any case in which the getter material has a melting temperature higher than the softening temperature of the glass part onto which the particles must be fixed. This condition may be empirically verified by simple indicative tests. As guidelines for choosing glass/getter couples, the temperatures set forth in the following table may be considered:

TABLE 1

| Material | | Characteristic Temperature or Range (° C.) | | |
|---|---|---|---|---|
| Glass | Getter | Softening | Workability | Melting |
| Lead glass |  | 400-630 | ~800 | / |
| Soda-lime |  | 630-720 | ~1000 | / |
| Borosilicates |  | 710-915 | 1050-1200 | / |
|  | St 198 | / | / | 930-1100 |
|  | St 787 | / | / | 980-1100 |
|  | St 707 | / | / | 1300-1500 |
|  | St 101 | / | / | ~1550 |
| Silica glass |  | 1530-1585 | 1800 | / |
|  | Titanium | / | / | 1660 |
| Quartz |  | 1730 | 1900 | / |
|  | Zirconium | / | / | 1852 |
|  | Niobium | / | / | 2486 |
|  | Tantalum | / | / | 2996 |

The data in the table are listed in increasing order of temperature, in particular with the criterion of comparing the melting temperatures (or temperature ranges) of getter materials with the softening temperatures of glasses. In this way, each getter material may be used in the method of the invention with all the glasses preceding it in the table. For a greater certainty of results, it is possible to resort to the comparison between temperatures (or ranges) of melting of getters and workability temperatures of glasses, also in this case by selecting getter/glass couples in which the melting temperature of the first one is comparable to or higher than the workability temperature of the second one.

The size of getter particles to be employed mainly depends on the size and the lateral resolution desired for the getter state. If small lateral dimensions and/or a high resolution are needed, it is necessary to use very fine particles, for example of a size less than about 10 μm, whereas if the available space for the layer is larger or the lateral resolution requirements are less strict, it is possible to use particles of a larger size, e.g. on the order of hundreds of microns.

The method of the invention will be further illustrated by the following example.

EXAMPLE

A deposit of glass material is produced on a square part of a borosilicate "7056 Corning" glass, of thickness 0.3 mm and side 1 cm. This is one of the borosilicate glasses most commonly used in the industry, and has a softening temperature of about 720° C. and a workability temperature of about 1060° C. As getter material, powders of the above-mentioned St 101 alloy of particle size less than 30 microns (μm) are employed. The glass part is held on a metal mask having a square hole of dimensions slightly smaller than the glass part, so as to form a frame that sustains the part. With this arrangement, room is left below the glass for accommodating a laser source. The getter powders are evenly distributed on the upper face of the glass part.

The laser source is a Lumonics JK 700 Nd-YAG laser, sold by CSI Group, Rugby, UK, of wavelength 1.064 μm (IR range). The laser source is mounted in a gas-tight cabinet provided by Ravasi Laser Systems of Brivio, Italy, and is connected to a robot arm whose displacements in the x and y directions are controlled through a program set on a computer. The cabinet is evacuated and backfilled with argon. The laser source is brought underneath the glass part, at a distance of 5 mm. The spot of laser light on the powders has a diameter of 0.1 mm.

The laser source is positioned under the glass at a position suitable for the subsequent scanning and it is turned on. Scanning occurs along ten parallel lines, spaced apart 0.1 mm, for segments of length 5 mm, at a speed of 0.5 m/s and with a power of 50 W. Due to the fact that the spot of the laser is 0.1 mm, in the test an overall rectangular area of 1×5 mm is irradiated.

At the end, the laser is turned off and the system is allowed to cool down during about 10 minutes. The glass is then removed from the metal mask, and the powders are removed from it by brushing. This leaves, however, an area of powders that are not removed, corresponding to the irradiated area. The getter deposit so obtained is tested in a "Scotch tape test," adhering a piece of Scotch tape onto the glass and across the deposit, and then removing the Scotch tape. The result is that the deposit of getter powders is not removed by the tape.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of forming a layer (12, 22) of getter material on a glass part (10, 20, 30) comprising the following steps:
   contacting a powder (11, 21) of a getter material with the glass part on which the layer is to be formed, the getter material being selected among titanium, zirconium, niobium, tantalum, and alloys based on zirconium or titanium with one or more transition metals, Rare Earth metals or aluminum;
   heating particles (31) of the powder directly in contact with the glass (30) at a temperature lower than a melting temperature of the particles, but higher than a softening temperature of the glass, by irradiating the particles in direct contact with the glass with laser radiation reaching the particles through the glass;
   allowing the glass and particles to cool until re-solidification of areas (32) of the glass softened or molten during the heating step; and
   removing possible powder particles not directly contacting the glass and not irradiated with the laser,
   wherein the powder contacting the glass part is a loose powder.

2. The method according to claim 1, wherein the glass part is flat.

3. The method according to claim 2, wherein the getter material particles (11) are spread on the glass part (10), the glass part being horizontally arranged.

4. The method according to claim 3, wherein the removing step is carried out by inclining the glass part or by aspiration.

5. The method according to claim 2, wherein the glass part (20) is laid on a bed of powder (21) inserted in a container (23) open at the top, the container having a sufficient area to receive the glass part.

6. The method according to claim 5, wherein the removing step is carried out by raising the glass part.

7. The method according to claim 1, wherein the heating step is carried out by a defocused laser.

8. The method according to claim 7, wherein the heating step is carried out using a mask for selecting a fraction of powder to be heated.

9. The method according to claim 1, wherein the heating step is carried out by scanning with laser radiation an area comprising particles of getter material corresponding to the area of glass onto which the layer of getter material is to be formed.

10. The method according to claim 1, wherein the steps of the method are carried out under vacuum or in an inert gas atmosphere for a time during which the particles of getter material are at temperatures higher than about 300° C.

11. The method according to claim 10, wherein all of the steps of the method are carried out under vacuum or in an inert gas atmosphere.

12. The method according to claim 1, wherein the getter material is selected among titanium, zirconium, niobium, tantalum, an alloy of weight composition Zr 84%-Al 16%, an alloy of weight composition Zr 76.5%-Fe 23.5%, an alloy of weight composition Zr 70%-Fe 5.4%-V 24.6%, and an alloy of weight composition Zr 80%-Co 15%-A 5%, wherein A is at least one Rare Earth metal.

13. The method according to claim 1, wherein the particles of getter material powder have a size on an order of hundreds of microns in diameter.

14. The method according to claim 1, wherein the particles of getter material powder have a size less than 10 μm in diameter.

15. The method according to claim 1, wherein a source of the laser irradiation is controlled through a feedback control system comprising a pyrometer, which realizes a condition that irradiation time is regulated so as to cause the particles of getter material not to reach a temperature over a preset value.

* * * * *